United States Patent [19]
Banning et al.

[11] Patent Number: 5,852,072
[45] Date of Patent: Dec. 22, 1998

[54] ERASABLE INK COMPOSITION CONTAINING A WATERBORNE POLYURETHANE UREA

[75] Inventors: Jeffery H. Banning, Spartanburg; Wayne A. Chandler, Mauldin; David C. Villiger, Greenville; Aiying Wang; Barry W. Chadwick, both of Simpsonville, all of S.C.

[73] Assignee: Bic Corporation, Milford, Conn.

[21] Appl. No.: 650,592

[22] Filed: May 20, 1996

Related U.S. Application Data

[63] Continuation of Ser. No. 357,601, Dec. 16, 1994, abandoned.

[51] Int. Cl.[6] .............................. C09D 5/00; C09D 11/00
[52] U.S. Cl. ............................. 523/161; 528/61; 524/840
[58] Field of Search ............................ 523/161; 528/61, 528/71, 73, 74; 524/839, 840, 591

[56] References Cited

U.S. PATENT DOCUMENTS

| | | | |
|---|---|---|---|
| 3,157,633 | 11/1964 | Kuhn | 260/200 |
| 3,586,654 | 6/1971 | Lerman et al. | 260/41 |
| 3,597,468 | 8/1971 | Kalopissis et al. | 260/465 D |
| 3,875,105 | 4/1975 | Daugherty et al. | |
| 3,949,132 | 4/1976 | Seregely et al. | |
| 4,059,554 | 11/1977 | Pacansky | 260/29.6 WQ |
| 4,097,290 | 6/1978 | Muller et al. | 106/30 |
| 4,137,083 | 1/1979 | Hedrick | 106/20 |
| 4,137,243 | 1/1979 | Farmer | 260/378 |
| 4,178,422 | 12/1979 | Otteson et al. | 525/336 |
| 4,200,601 | 4/1980 | McClain | 264/9 |
| 4,212,676 | 7/1980 | Ueda | 106/19 |
| 4,227,930 | 10/1980 | Lin | 106/19 |
| 4,244,862 | 1/1981 | Handa et al. | 260/42.47 |
| 4,256,494 | 3/1981 | Yamamoto et al. | 106/22 |
| 4,284,729 | 8/1981 | Cross et al. | 521/158 |
| 4,297,260 | 10/1981 | Ferrer, Jr. et al. | 260/29.7 H |
| 4,314,808 | 2/1982 | Jacquet et al. | 8/405 |
| 4,329,262 | 5/1982 | Muller | 523/161 |
| 4,329,264 | 5/1982 | Muller | 523/161 |
| 4,339,237 | 7/1982 | Wang et al. | 8/405 |
| 4,349,639 | 9/1982 | Muller | 523/161 |
| 4,357,431 | 11/1982 | Murakami et al. | 523/161 |
| 4,367,966 | 1/1983 | Williams et al. | 401/190 |
| 4,368,076 | 1/1983 | Iijima | 106/22 |
| 4,379,867 | 4/1983 | Noriaki | 523/161 |
| 4,389,499 | 6/1983 | Riesgraf | 523/161 |
| 4,390,646 | 6/1983 | Ferguson | 523/161 |
| 4,391,927 | 7/1983 | Farmer, III | 523/161 |
| 4,397,651 | 8/1983 | Degen et al. | 8/506 |
| 4,407,985 | 10/1983 | Muller | 523/161 |
| 4,410,643 | 10/1983 | Muller | 523/161 |
| 4,419,464 | 12/1983 | Williams et al. | 523/161 |
| 4,421,660 | 12/1983 | Solc nee Hajna | 252/62.54 |
| 4,441,928 | 4/1984 | Iijima | 106/21 |
| 4,471,079 | 9/1984 | Enami | 523/161 |
| 4,476,210 | 10/1984 | Croucher et al. | 430/114 |
| 4,509,982 | 4/1985 | Iijima | 106/23 |
| 4,525,216 | 6/1985 | Nakanishi | 106/30 |
| 4,530,961 | 7/1985 | Nguyen et al. | 524/832 |
| 4,545,818 | 10/1985 | Inoue et al. | 106/22 |
| 4,557,618 | 12/1985 | Iwata et al. | 401/34 |
| 4,578,117 | 3/1986 | Nakanishi | 106/20 |
| 4,596,846 | 6/1986 | Bohne et al. | 524/173 |
| 4,606,769 | 8/1986 | Tanaka et al. | 106/30 |
| 4,629,748 | 12/1986 | Miyajima et al. | 523/161 |
| 4,671,691 | 6/1987 | Case et al. | 401/142 |
| 4,686,246 | 8/1987 | Gajria | 523/161 |
| 4,687,791 | 8/1987 | Miyajima et al. | 523/161 |
| 4,693,846 | 9/1987 | Piccirilli et al. | 260/97 |
| 4,705,567 | 11/1987 | Hair et al. | 106/20 |
| 4,721,739 | 1/1988 | Brenneman et al. | 523/161 |
| 4,726,845 | 2/1988 | Thompson et al. | 106/25 A |
| 4,738,725 | 4/1988 | Daugherty et al. | 106/32 |
| 4,740,549 | 4/1988 | Okuzono et al. | 524/379 |
| 4,753,658 | 6/1988 | Okuzono et al. | 8/513 |
| 4,760,104 | 7/1988 | Miyajima et al. | 523/161 |
| 4,770,706 | 9/1988 | Pietsch | 106/24 R |
| 4,778,742 | 10/1988 | Ong et al. | 430/106 |
| 4,786,198 | 11/1988 | Zgambo | 401/142 |
| 4,789,399 | 12/1988 | Williams et al. | 106/20 R |
| 4,813,973 | 3/1989 | Winnik et al. | 8/647 |
| 4,830,670 | 5/1989 | Danyu | 106/23 B |
| 4,940,628 | 7/1990 | Lin et al. | 428/207 |
| 4,942,185 | 7/1990 | Inoue et al. | 521/54 |
| 4,945,121 | 7/1990 | Micale et al. | 523/339 |
| 4,950,303 | 8/1990 | Ishii | 8/513 |
| 4,954,174 | 9/1990 | Imagawa | 106/27 R |
| 4,960,464 | 10/1990 | Chen | 106/19 D |
| 4,971,628 | 11/1990 | Loftin | 106/22 F |
| 4,988,123 | 1/1991 | Lin et al. | 281/15.1 |
| 5,004,763 | 4/1991 | Imagawa | 523/161 |
| 5,009,536 | 4/1991 | Inoue et al. | 401/198 |
| 5,010,125 | 4/1991 | Kruse et al. | 524/308 |
| 5,013,361 | 5/1991 | Case et al. | 106/22 F |
| 5,024,700 | 6/1991 | Britton, Jr. | 106/32 |
| 5,024,898 | 6/1991 | Pitts et al. | 428/511 |
| 5,030,697 | 7/1991 | Hugl et al. | 525/326.9 |
| 5,037,702 | 8/1991 | Pitts et al. | 428/423.7 |
| 5,048,992 | 9/1991 | Loftin | 401/209 |

(List continued on next page.)

FOREIGN PATENT DOCUMENTS

| | | |
|---|---|---|
| 0054832 | 6/1982 | European Pat. Off. |
| 0556668 | 8/1993 | European Pat. Off. |
| 1-289881 | 5/1988 | Japan . |
| 8301625 | 5/1983 | WIPO . |
| 9312175 | 6/1993 | WIPO . |
| 9324565 | 12/1993 | WIPO . |

OTHER PUBLICATIONS

Rosthauser et al., "Waterborne Polyurethanes", Excerpt from Advances in Urethane Science and Technology, K.C. Frisch and D. Klempner, Editors, vol. 10, pp. 121–162 (1987).

*Primary Examiner*—James J. Seidleck
*Assistant Examiner*—U. K. Rajguru
*Attorney, Agent, or Firm*—Pennie & Edmonds LLP

[57] ABSTRACT

An erasable ink composition contains a water-insoluble polymeric dye obtained from the polymerization of at least two coreactive polyfunctional monomers with at least one of the monomers possessing a dye moiety covalently bonded thereto. The ink is intended for use in any of a variety of marking instruments, in particular, a ball-point pen.

22 Claims, No Drawings

U.S. PATENT DOCUMENTS

| | | | |
|---|---|---|---|
| 5,082,495 | 1/1992 | Iijima | 106/21 A |
| 5,100,471 | 3/1992 | Winnik et al. | 106/23 |
| 5,104,913 | 4/1992 | Sharma et al. | 523/339 |
| 5,106,881 | 4/1992 | Inoue et al. | 521/54 |
| 5,114,479 | 5/1992 | Keaveney et al. | 106/30 R |
| 5,120,359 | 6/1992 | Uzukawa et al. | 106/20 A |
| 5,124,400 | 6/1992 | Tirpak et al. | 524/591 |
| 5,160,369 | 11/1992 | Parkinson et al. | 106/19 R |
| 5,176,745 | 1/1993 | Moore et al. | 106/22 R |
| 5,194,463 | 3/1993 | Krutak et al. | 524/35 |
| 5,203,913 | 4/1993 | Yamamoto et al. | 106/22 B |
| 5,217,255 | 6/1993 | Lin et al. | 281/15.1 |
| 5,231,135 | 7/1993 | Machell et al. | 525/123 |
| 5,254,425 | 10/1993 | Suzuki et al. | 430/115 |
| 5,275,647 | 1/1994 | Winnik | 106/22 E |
| 5,280,062 | 1/1994 | Blum et al. | 524/591 |
| 5,281,261 | 1/1994 | Lin | 106/20 R |
| 5,286,777 | 2/1994 | Schoeler et al. | 524/460 |
| 5,336,307 | 8/1994 | Horvat et al. | 106/19 B |
| 5,338,775 | 8/1994 | Matz et al. | 523/161 |
| 5,348,989 | 9/1994 | Shiraishi | 523/161 |
| 5,354,807 | 10/1994 | Dochniak | 524/591 |

ERASABLE INK COMPOSITION CONTAINING A WATERBORNE POLYURETHANE UREA

This is a continuation of application Ser. No. 08/357,601 filed on Dec. 16, 1994 now abandoned.

BACKGROUND OF THE INVENTION

This invention relates to an erasable ink composition and to a marking instrument, e.g., a ball-point pen, containing the composition. More particularly, this invention relates to an erasable ink composition containing a water-insoluble polymer dye component, i.e., a polymer possessing a dye moiety covalently bonded thereto.

Numerous erasable ink compositions are known, e.g., those described in U.S. Pat. Nos. 3,834,823, 3,875,105, 3,949,132, 4,097,290, 4,212,676, 4,227,930, 4,256,494, 4,297,260, 4,329,262, 4,329,264, 4,349,639, 4,357,431, 4,367,966, 4,368,076, 4,379,867, 4,389,499, 4,390,646, 4,391,927, 4,407,985, 4,410,643, 4,419,464, 4,441,928, 4,509,982, 4,525,216, 4,557,618, 4,578,117, 4,596,846, 4,606,769, 4,629,748, 4,687,791, 4,721,739, 4,738,725, 4,760,104, 4,786,198, 4,830,670, 4,954,174, 4,960,464, 5,004,763, 5,024,898, 5,037,702, 5,082,495, 5,114,469, 5,120,359, 5,160,369 and 5,217,255. These inks are formulated by mixing a dye (taken herein to also include "pigment", "colorant", "chromophore" and other terms of similar meaning) with a variety of polymer and liquid carrier/solvent combinations thereby forming a flowable dye/polymer matrix. The polymer component is chosen for its film forming properties and its ability to be readily removed from the substrate to which it is applied, e.g., cellulosic paper, through the abrasive action of an eraser. However, a common problem with these erasable ink compositions concerns the residual dye which remains after erasure. Incomplete erasure may be attributed to inadequate removal of the dye/polymer matrix from the paper substrate and/or migration of dye into the pores of the substrate.

SUMMARY OF THE INVENTION

In accordance with the present invention an erasable ink composition is provided which comprises:

a) a water-insoluble polymer dye obtained by effecting polymerization of a polymer-forming reaction medium containing at least two coreactive polyfunctional monomers with at least one of the monomers possessing a dye moiety covalently bonded thereto; and, b) an evaporable liquid carrier for the polymer dye.

Since the dye is covalently bonded to the polymer in the erasable ink composition of this invention, there is little opportunity for it to separate from the polymer and migrate into a porous substrate. Thus, the erasable ink composition of this invention is apt to leave significantly less residual dye following its erasure than known erasable ink compositions in which the dye is merely physically combined with the polymer component(s).

DESCRIPTION OF THE PREFERRED EMBODIMENTS

The polymer dye component of the erasable ink composition of this invention is prepared by polymerizing at least two coreactive polyfunctional monomers with at least one of the monomers possessing a dye moiety covalently bonded thereto. At least one of the monomers must be sufficiently hydrophobic as to render the resulting polymer dye water-insoluble. Part or all of the polyfunctional monomers can be oligomeric or polymeric in nature. The expression "polyfunctional monomer" characterizes those compounds possessing at least two reactive functional groups (not counting any sites of unsaturation that may be present) such as, but not limited to, hydroxyl, sulfhydryl, carboxylic acid, amine, nitrile, acyl halide and isocyanate groups. The expression also includes compounds which, under polymerization reaction conditions, present polyfunctionality, e.g., lactones and lactams which on opening of their rings are chemically equivalent to $\alpha,\omega$-hydroxy-carboxylic acids and $\alpha,\omega$-aminocarboxylic acids, respectively.

Polymeric dyes of the type that are useful in the erasable ink composition of this invention are known (but for applications other than erasable ink compositions) or can be prepared by appropriate modification of known polymer-forming procedures. Illustrative of such known polymeric dyes are those disclosed in U.S. Pat. Nos. 4,778,742, 5,104,913, and 5,194,463, the contents of which are incorporated by reference herein.

In accordance with U.S. Pat. No. 4,778,742, a polymeric dye of the general formula

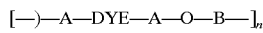

wherein A is selected from the group consisting of alkylene and arylene, B is selected from the group consisting of

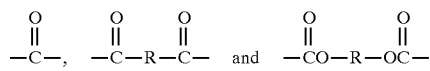

wherein R is an alkylene group, an arylene segment or a polyether segment, DYE is a dye moiety and n is from about 2 to about 100 and preferably from about 5 to about 35, can be prepared by a solution or interfacial polymerization process. In solution polymerization, stoichiometric amounts of polyfunctional monomers, specifically, a bisphenoxy-functionalized dye and a diacyl halide, are reacted in a suitable solvent medium, e.g., an aliphatic halogenated hydrocarbon such as methylene chloride, in the presence of an excess amount of a tertiary amine such as triethylamine base. Polymerization is then effected at a temperature of from about 5° C. to about 30° C. and completed in about 0.5 to 3 hours. In interfacial polymerization, a bisphenoxy-functionalized dye is initially dissolved in an aqueous alkaline solution in the presence of an emulsifying agent. Thereafter, the resulting solution is stirred and treated with a solution of an appropriate bifunctional monomer such as a diacyl chloride or a bishaloformate in a water-immiscible solvent such as methylene chloride to obtain, respectively, the polyester dye or the polycarbonate dye. The polymeric dyes from the solution polymerization process are then further treated by washing the reaction mixture with water followed by precipitation of a methylene chloride solution of the dyes from a non-solvent such as hexane or methanol. Also, with the interfacial process, the polymeric dyes are separated by simple filtration followed by washing thoroughly with water.

Examples of bisphenoxy-functionalized dye monomers that can be used to prepare the polymeric dyes of U.S. Pat. No. 4,778,742 include 1,5-bis(p-hydroxyphenylthio) anthraquinone, 1,8-bis(p-hydroxyphenylythio) anthraquinone, 1,5-bis(p-hydroxyphenylthio)-4,8-bis (phenylthio) anthraquinone, 1,8-bis[2-(p-hydroxyphenyl) ethylamino]anthraquinone, 1,5-bis[2-(p-hydroxyphenyl) ethylamino]anthraquinone, 1,4-bis[2-(p- hydroxyphenylamino) anthraquinone, 1,4-bis[2-(p-hydroxyphenyl)ethylamino]anthraquinone, 1,4-bis[2-(p-hydroxyphenylthio) anthraquinone and 6-phenylthio-1,4-bis[2-(p-hydroxy-phenyl)ethylamino]anthraquinone.

Examples of diacyl halide monomers that can be reacted with the bisphenoxy-functionalized dye monomers to provide the polymeric dye of U.S. Pat. No. 4,778,742 include succinyl chloride, glutaryl chloride, adipoyl chloride, dimethylglutaryl chloride, sebacoyl chloride, phthaloyl chloride, isophthaloyl chloride, terephthaloyl chloride, and the like. Examples of useful bishaloformates include diethyleneglycol bischloroformate, triethyleneglycol bischloroformate, tetraethyleneglycol bischloroformate, biphenoxy bischloroformate, propyleneglycol bischloroformate, dipropyleneglycol bischloroformate, butyleneglycol bischloroformate, ethyleneglycol bisbromoformate, propyleneglycol bisbromoformate, and the like.

The polymeric dye of U.S. Pat. No. 5,104,913 is obtained by polymerizing a polyfunctional monomer possessing a dye moiety covalently bonded thereto, a terephthalic acid and/or 2,6-naphthalenedicarboxylic acid and a branched-chain diol of the general formula

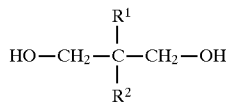

wherein $R^1$ is hydrogen or an unsubstituted or substituted alkyl, cycloalkyl or aryl radical and $R^2$ is an unsubstituted or substituted alkyl, cycloalkyl or aryl radical. The dye-containing monomer can be selected from anthraquinone, methine, bis-methine, anthrapyridone, 2,5-diarylamino-terephthalic acid or ester, coumarin, quinophthalone, perylene and other thermally-stable dye compounds possessing functional groups that are reactive for the carboxylic and/or hydroxyl groups of the other monomers, i.e., hydroxyl, carboxyl, ester, amino, alkylamino, etc., groups, such that the dye will be incorporated in the resulting polyester. Examples of dye-containing monomers include anthraquinone dyes and methine dyes possessing two reactive functional groups selected from the aforementioned types.

U.S. Pat. No. 5,194,463 describes a polymer dye which is a polyurethane of the general formula

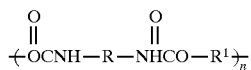

wherein R is a divalent radical selected from optionally substituted $C_2$–$C_{10}$-alkylene, $C_3$–$C_8$-cycloalkylene, arylene, $C_1$–$C_4$-alkylene-arylene-$C_1$–$C_4$-alkylene, $C_1$–$C_4$-alkylene-$C_3$–$C_8$-cycloalkylene-$C_1$–$C_4$-alkylene or $C_1$–$C_4$-alkylene-1,2,3,4,5,6,7-octahydronaphthalene-2,6-diyl-$C_1$–$C_4$-alkylene; $R^1$ is a divalent organic radical comprised of about 1 to 100 mole percent of the residue of a dye bonded to two hydroxyl groups through alkylene moieties with any remainder of $R^1$ comprised of the residue of organic diols of the formula HO—$R^2$—OH in which $R^2$ is a divalent radical selected from $C_2$–$C_{18}$ alkylene, $C_3$–$C_8$-cycloalkylene, $C_{1-4}$ alkylene-1,2,3,4,5,6,7,8-octahydronaphthalen-2,6-diyl-$C_1$–$C_4$ alkylene, $C_{1-4}$-alkylene-$C_3$–$C_8$-cycloalkylene-$C_1$–$C_4$-alkylene, $C_{1-4}$ alkylene-arylene-$C_1$–$C_4$-alkylene, $C_2$–$C_4$ alkylene-O-$C_2$–$C_4$ alkylene, $C_2$–$C_4$ alkylene-S-$C_2$–$C_4$ alkylene or $C_2$–$C_4$ alkylene-O-$C_2$–$C_4$ alkylene-O-$C_2$–$C_4$ alkylene; and n is equal to or greater than 2.

The dye containing the hydroxyl groups can be selected from a variety of chromophoric classes including azo, metallized azo, diazo, methine, or arylidene, polymethine, azomethine, anthraquinone, azamethine, anthrapyridone (3H-dibenz [f,ij] isoquinoline-2,7-dione), anthrapyridine (7H-dibenz [f,ij] isoquinoline-7-one), phthaloylphenothiazine (14H-naphtho [2,3-a] phenothiazine-8,13-dione), benzanthrone (7H(de)anthracene-7-one), anthrapyrimidine (7H-benzo [e] perimidine-7-one), anthrapyrazole, anthraisothiazole, triphenodioxazine, thiaxanthene-9-one, flourindine (5, 12-dihydroquinoxaline [2,3-b] phenazine), quinophthalone, phthalocyanine, naphthalocyanine, nickel dithiolenes, coumarin (2H-1-benzopyran-2-one), coumarin imine (2H-1-benzopyran-2-imine), indophenol, perinone, nitroarylamine, benzodifuran, phthaloylphenoxazine (14H-naphtho[2,3-a]phenoxazine-8,13-dione), phthaloylacridone (13H-naphtho[2,3-c] acridine 5,8,14-trione), anthraquinone-thioxanthone (8H-naphtho[2,3-c]thioxanthene-5,8,13-trione), anthrapyridazone, naphtho[1',2',3':4,5]quino[2,1-b] quinazoline-5,10-dione, 1H-anthra(2,1-b)(1,4) thiazin-7,12-dione, indigo, thioindigo, xanthene, acridine, azine, oxazine, 1,4- and 1,5-naphthoquinones, pyromellitic acid diimide, naphthalene-1,4,5,8-tetracarboxylic acid diimide, 3,4,9,10-perylenetetracarboxylic acid diimide, hydroxybenzophenone, benzotriazole, naphthotriazole, naphthoquinone, diminoisoindoline, naphthopyran (3H-naphtho[2,1-b]pyran-3-ones and 3-imines) and aminonaphthalimide.

The polyurethane of U.S. Pat. No. 5,194,463 can be obtained by reacting one or more of the dihydroxyl-containing dyes with a diisocyanate and, if desired, another diol, employing known procedures.

Numerous modifications of the foregoing known processes for obtaining a polymeric dye that can be utilized in the erasable ink composition of this invention are possible. For example, part or all of the bisphenoxy-functionalized dye monomer of U.S. Pat. No. 4,778,742, the functionalized dye monomer of U.S. Pat. No. 5,104,913 or the hydroxyl-containing dye monomer of U.S. Pat. No. 5,194,463 can be replaced with a polyfunctional polymer dye monomer of the general formula

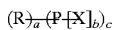

wherein R is a dye moiety covalently bonded to polymer residue P, X is a functional group, a, b and c each is at least 1, provided, the product of b×c is at least 2, when c is at least 2, a is 1 and where there is more than one R, P or X, each R, P or X can be the same or different. Dye moiety R can be derived from among any of the polyfunctionalized dye monomers previously mentioned, polymer residue P can be that of a polyether, polyester, polyamide, polycarbonate, or the like, and X can include hydroxyl, sulfhydryl, carboxyl, primary amine, secondary amine and isocyanate reactive groups. For example, a dihydroxyl-containing dye such as one described in U.S. Pat. No. 5,194,463 or some other dihydroxyl-containing dye can be reacted with ethylene oxide, propylene oxide or a mixture thereof to provide a hydroxyl-terminated liquid polyether dye monomer. Polyether dyes of this type are known from U.S. Pat. Nos. 3,157,633 and 4,284,729, the disclosures of which are incorporated by reference herein. Similarly, the dihydroxyl-containing dye can be reacted with an α,ω-hydroxycarboxylic acid or cyclic ester analog thereof, for example ε-caprolactone, to provide a hydroxyl-terminated liquid polyester dye monomer. Either the polyether or polyester dye monomer can be reacted with a polyisocyanate or an isocyanate-terminated prepolymer to provide the water-insoluble polymer dye component of the erasable ink composition herein.

A preferred polymer dye for use herein is one prepared by a waterborne process, i.e., a polymerization process in which the resulting polymer is provided as an aqueous emulsion or dispersion of polymer dye particles. The polymer dye emulsion with or without the addition of other components can, if desired, be utilized directly as the erasable ink composition of this invention thus eliminating any further manufacturing operations (unlike the case of bulk polymer dyes which would require pulverization to the desired particle size followed by addition of some suitable evaporable liquid carrier).

A particularly preferred waterborne polymer dye for use herein is a waterborne polyurethane-urea prepared by modification of any of the polymerization processes described in Frisch et al., ed., "Advances in Urethane Science and Technology", Vol. 10, pp. 121–162 (1987), the contents of which are incorporated by reference herein. The modification referred to involves the substitution of part or all of one or more of the polyfunctional reactants employed in these processes with a polyfunctional monomer possessing covalently bonded dye in accordance with the present invention. Especially suitable are the polyfunctional polymer dye monomers of U.S. Pat. No. 5,231,135 which contain a dye moiety covalently bonded thereto and at least two groups that are reactive for isocyanate. The contents of U.S. Pat. No. 5,231,135 are incorporated by reference herein. These processes, respectively, the solvent, melt dispersion, prepolymer mixing and ketamine/ketazine processes, can be summarized as follows:

1. The Solvent Process

The solvent process involves the steps of:

a) reacting a polymeric polyol with a diisocyanate to provide an isocyanate group-terminated prepolymer possessing or lacking sufficient hydrophilic groups to render the prepolymer self-dispersible;

b) reacting the isocyanate group-terminated prepolymer dissolved in organic solvent with an aliphatic diamine chain extender and, where the prepolymer lacks sufficient hydrophilic groups to be self-dispersible, an aliphatic diamine chain extender possessing at least one hydrophilic group, to provide an organic solvent solution of self-dispersible polyurethane-urea; and, c) adding a sufficient amount of water to the organic solvent solution of the polyurethane-urea to form a dispersion of polyurethane-urea particles, at least one of said polymeric polyol, diisocyanate and aliphatic diamine possessing a dye moiety covalently bonded thereto.

2. The Melt Dispersion Process

The melt dispersion process involves the steps of:

a) reacting a polymeric polyol, an aliphatic diol possessing at least one ionic group and a diisocyanate to provide an isocyanate group terminated prepolymer possessing ionic groups;

b) reacting the isocyanate group-terminated prepolymer with a formaldehyde-reactive capping agent to cap the isocyanate end groups;

c) dispersing the capped prepolymer in water; and, d) reacting the dispersed capped prepolymer with formaldehyde to provide dispersed polyurethane-urea particles, at least one of said polymeric polyol, diisocyanate and aliphatic diamine possessing a dye moiety covalently bonded thereto.

3. The Prepolymer Mixing Process

The prepolymer mixing process involves the steps of:

a) reacting a polymeric polyol, a carboxylic group-containing diol and an aliphatic diisocyanate to provide an isocyanate group-terminated prepolymer possessing free carboxyl groups;

b) reacting the prepolymer with a tertiary amine to convert the carboxyl groups to ammonium carboxylate groups and render the prepolymer self-dispersible;

c) dispersing the self-dispersible prepolymer in water; and, d) reacting the dispersed prepolymer with a diamine chain extender to provide an aqueous dispersion of polyurethane-urea particles, at least one of said polymeric polyol, carboxyl group-containing diol, aliphatic diisocyanate and aliphatic liquid diamine chain extender possessing colorant covalently bound thereto.

4. The Ketamine/Ketazine Process

The ketamine/Ketazine process involves the steps of:

a) reacting a polymeric polyol, a carboxylic group-containing diol and a diisocyanate to provide an isocyanate group-terminated prepolymer possessing free carboxyl groups;

b) reacting the prepolymer with a tertiary amine to convert the carboxyl groups to ammonium carboxylate groups and render the prepolymer self-dispersible;

c) reacting the self-dispersible prepolymer with at least one member of the group consisting of ketimine and ketazine in the presence of water to provide an aqueous dispersion of polyurethane-urea particles, at least one of said polymeric polyol, carboxyl group-containing diol, aliphatic diisocyanate and aliphatic liquid diamine chain extender possessing colorant covalently bound thereto.

In a preferred embodiment of these waterborne processes, the polymeric polyol is one of the general formula R—(P—OH)$_2$ wherein R is a covalently bound dye chromophore and each P is the same or different polymer residue. Examples of such polymeric polyols include any of the previously mentioned dihydroxyl-terminated liquid polyether or polyester dye monomers containing a covalently bonded dye moiety.

The polymer dye component of the erasable ink composition of this invention will generally possess an average particle size of from about 25 to about 5000 nanometers and preferably from about 50 to about 2000 nanometers. Where the polymer dye component is not obtained in a particle size which is suitable for use in the erasable ink composition herein, it may be reduced to such size by any known or conventional method for obtaining polymer powders, for example, by grinding, milling, or by any of several "hot water" emulsification processes for producing polymer powders such as that described in U.S. Pat. No. 3,586,654, the contents of which are incorporated by reference herein.

The fully formulated erasable ink composition, i.e., the polymeric dye component in admixture with the evaporable liquid carrier component and any optional component(s), can possess a relatively low viscosity, e.g., from about 1 to about 80,000 centipoises and preferably from about 3 to about 30,000 centipoises when water is the carrier, or a relatively high viscosity, e.g., at least about 100,000 centipoises and preferably at least about 500,000 centipoises when the carrier is an organic solvent or mixture of organic solvents which swell or dissolve the polymer dye. It will, of course, be recognized that when the erasable ink composition possesses such a high viscosity that it no longer readily flows solely under the influence of gravity, it becomes necessary to provide a pressurized delivery system for any marking instrument containing the ink.

To improve or optimize one or more functional characteristics of the erasable ink composition, one or more optional components can be added in the usual amounts to the composition, e.g., one or more natural and/or synthetic polymer latices, rheological modifiers, suspension agents, humectants, emulsifiers, surfactants, plasticizers, spreading agents, drying agents, release agents, parting agents, preservatives, antimicrobial agents, anticorrosion agents, antioxidants, coalescing aids, and the like.

With or without the addition of any optional component (s), the erasable ink composition when applied to a substrate, and particularly a porous substrate such as a cellulosic paper, and upon drying thereon must be (1) sufficiently adherent to the substrate as to resist flaking therefrom and (2) substantially erasable. Thus, the dry erasable ink composition of this invention applied to paper and evaluated by the adherency test described infra will generally exhibit less than about 30 weight percent flaking, preferably less than about 20 weight percent flaking and even more preferably less than about 10 weight percent flaking. Erasability values delta E*ab of the erasable ink composition herein as measured by ASTM D-2244-89 will generally be on the order of less than about 4.0, preferably less than about 3.5 and even more preferably less than about 3.0.

It is preferred that the erasable ink composition herein when evaluated by the smearability test described infra exhibit a subjectively determined low level of smear, e.g., a smear value of 2 or less and preferably a smear value of 1 (i.e., essentially no smearing).

The erasable ink composition of this invention is intended to be used in any of a variety of marking instruments and in particular, a ball-point pen.

The following examples are illustrative of the erasable ink composition of this invention.

EXAMPLES ILLUSTRATING THE PREPARATION OF POLYFUNCTIONAL PREPOLYMERS POSSESSING COVALENTLY BONDED DYE MOIETY

Example 1

Dimethylolpropionic acid (8.25 g) was dissolved in N-methyl pyrollidone (13.8 g). To this solution, polytetramethylene glycol (TERETHANE T-2900 from Dupont) (208.2 g), polyol colorant (15.0 g) corresponding to Colorant C from Table I of U.S. Pat. No. 5,231,135, isopherone diisocyanate (42.40 g) and dibutyltindilaurate catalyst (0.72 g) were added. The solution was heated to a temperature of from about 60° to about 70° C. for about 3 to about 5 hours under stirring. The color of the resulting isocyanate group-terminated prepolymer having dye covalently bonded thereto was red.

Example 2

Dimethylolpropionic acid (7.37 g) was dissolved in N-methyl pyrollidone (12.31 g). To this solution, polytetramethylene glycol (TERETHANE T-2900 from Dupont) (151.2 g) and polybutylene glycol (BO-4800 from Dow Chemical) (84.0 g), polyol colorant (5.0 g) corresponding to Colorant C from Table I of U.S. Pat. No. 5,231,135, isopherone diisocyanate (42.40 g) and dibutyltindilaurate catalyst (0.48 g) were added. The solution was heated to a temperature of from about 60° to about 70° C. for about 3 to about 5 hours under stirring. The color of the resulting isocyanate group-terminated prepolymer having dye covalently bonded thereto was red.

Example 3

Dimethylolpropionic acid (3.50 g) was dissolved in N-methyl pyrollidone (5.84 g). To this solution, polytetramethylene glycol (TERETHANE T-2900 from Dupont) (305.9 g), polyol colorant (5.0 g) corresponding to Colorant U from Table I of U.S. Pat. No. 5,231,135, polyol colorant (5.0 g) corresponding to Colorant G from Table I of U.S. Pat. No. 5,231,135, isopherone diisocyanate (42.40 g) and dibutyltindilaurate catalyst (0.12 g) were added. The solution was heated to a temperature of from about 60° to about 70° C. for about 3 to about 5 hours under stirring. The color of the resulting isocyanate group-terminated prepolymer having dye covalently bonded thereto was violet-blue.

Example 4

Dimethylolpropionic acid (8.08 g) was dissolved in N-methyl pyrollidone (13.5 g). To this solution, polytetramethylene glycol (TERETHANE T-2900 from Dupont) (184.5 g), polyol colorant (5.0 g) corresponding to Colorant C from Table I of U.S. Pat. No. 5,231,135, isopherone diisocyanate (42.40 g) and dibutyltindilaurate catalyst (0.48 g) were added. The solution was heated to a temperature of from about 60° to about 70° C. for about 3 to about 5 hours under stirring. The color of the resulting isocyanate group-terminated prepolymer having dye covalently bonded thereto was red.

Example 5

Dimethylolpropionic acid (8.08 g) was dissolved in N-methyl pyrollidone (13.5 g). To this solution, polytetramethylene glycol (TERETHANE T-2900 from Dupont) (174.6 g), polyol colorant (5.0 g) corresponding to Colorant C from Table I of U.S. Pat. No. 5,231,135, isopherone diisocyanate (42.40 g) and dibutyltindilaurate catalyst (0.48 g) were added. The solution was heated to a temperature of from about 60° to about 70° C. for about 3 to about 5 hours under stirring. The color of the resulting isocyanate group-terminated prepolymer having dye covalently bonded thereto was red.

Example 6

Isopherone diisocyanate (42.40 g) and polytetramethylene glycol (TERETHANE T-2900 from Dupont) (174.6 g) were admixed. To this mixture, polyol colorant (5.0 g) corresponding to Colorant U from Table I of U.S. Pat. No. 5,231,135 was added. The mixture was dissolved in methylethylketone (120 g) and dibutyltindilaurate catalyst (0.24 g) was added to the solution which was stirred at room temperature overnight. The color of the resulting isocyanate group-terminated prepolymer having dye covalently bonded thereto was violet.

EXAMPLES ILLUSTRATING THE PREPARATION OF POLYMER DYES

Example 7

The prepolymer mixing process was carried out as follows: the prepolymer of Example 1 was reacted with triethyl amine (6.22 g) neutralizing agent to convert the carboxyl groups in the prepolymer to ammonium carboxylate groups and render the prepolymer self-dispersible. Thereafter, the self-dispersible prepolymer was dispersed in water (241 g) using an impeller-type dispersion blade. The dispersed prepolymer was then reacted at room temperature with hydrazine (3.93 g) chain extender to provide a dispersion of polyurethane-urea particles of approximately 55.0 weight percent solids.

Example 8

The prepolymer mixing process was carried out as follows: the prepolymer of Example 2 was reacted with triethyl amine (5.60 g) neutralizing agent to convert the carboxyl groups in the prepolymer to ammonium carboxylate groups and render the prepolymer self-dispersible. Thereafter, the self-dispersible prepolymer was dispersed in water (300 g) using an impeller-type dispersion blade. The dispersed prepolymer was then reacted at about 76° C. with hydrazine (5.76 g) chain extender to provide a dispersion of polyurethane-urea particles of approximately 50.7 weight percent solids.

Example 9

The prepolymer mixing process was carried out as follows: the prepolymer of Example 3 was reacted with triethyl amine (2.64 g) neutralizing agent to convert the carboxyl groups in the prepolymer to ammonium carboxylate groups and render the prepolymer self-dispersible. Thereafter, the self-dispersible prepolymer was dispersed in water (436 g) using an impeller-type dispersion blade. The dispersed prepolymer was then reacted at room temperature with hydrazine (1.49 g) chain extender to provide a dispersion of polyurethane-urea particles of approximately 45.9 weight percent solids.

Example 10

The prepolymer mixing process was carried out as follows: the prepolymer of Example 4 was reacted with triethyl amine (6.09 g) neutralizing agent to convert the carboxyl groups in the prepolymer to ammonium carboxylate groups and render the prepolymer self-dispersible. Thereafter, the self-dispersible prepolymer was dispersed in water (300 g) using an impeller-type dispersion blade. The dispersed prepolymer was then reacted at room temperature with hydrazine (5.82 g) chain extender to provide a dispersion of polyurethane-urea particles of approximately 46.4 weight percent solids.

Example 11

The prepolymer mixing process was carried out as follows: the prepolymer of Example 5 was reacted with triethyl amine (6.09 g) neutralizing agent to convert the carboxyl groups in the prepolymer to ammonium carboxylate groups and render the prepolymer self-dispersible. Thereafter, the self-dispersible prepolymer was dispersed in water (300 g) using an impeller-type dispersion blade. The dispersed prepolymer was-then reacted at room temperature with hydrazine (5.82 g) chain extender to provide a dispersion of polyurethane-urea particles of approximately 46.9 weight percent solids.

Example 12

The solvent process was carried out as follows: the prepolymer of Example 6 dissolved in methylethylketone was reacted at room temperature with hydrazine (2.15 g) chain extender to provide an organic solvent solution of polyurethane-urea of approximately 64.9 weight percent solids.

The properties of the polymer dyes of Examples 7–12 are presented in Table I as follows:

TABLE I

| Example | Average Particle Size (Dry) (nm) | Color (Dry) | $T_g$ (°C.) |
|---|---|---|---|
| 7 | 50–500 | Red | <60 |
| 8 | 250 | Red | <60 |
| 9 | 250–2000 | Violet-blue | <60 |
| 10 | 150 | Red | <60 |
| 11 | 150 | Red | <60 |
| 12 | N/A (solution) | Violet | <60 |

The polymer dye compositions of Examples 7–12 can be directly employed as erasable ink compositions or be combined with one or more optional components such as an emulsion prior to being employed as erasable ink compositions.

To further illustrate the erasable ink composition of this invention, the polymer dye of Example 7 was combined with a silicone emulsion, i.e., SWS-233 Silicone Emulsion from Wacker Chemical Corp., to provide an erasable ink composition (Example 13) containing 90 weight percent polymer dye and 10 weight percent silicone emulsion. In another example, the polymer dye of Example 9 was combined with an emulsion containing 25.0 weight percent sorbitan sesquaoleate, i.e., Glycomol SOC from Lonza, 1.67 weight percent sodium dodecylbenzenesulfonate, i.e., Rhodocal DS4 from Rhone Poulenc, 1.67 weight percent nonylphenolethoxylate sulfate, i.e., Abex EP120 from Rhone Poulenc, and 71.66 weight percent water to provide an erasable ink composition (Example 14) containing 90 weight percent polymer dye and 10 weight percent of the emulsion.

The properties of the erasable ink compositions of Examples 13 and 14 were evaluated. In particular, the color intensity, viscosity, adherency, erasability and smearability of the erasable ink compositions were evaluated.

Color intensity was evaluated by a subjective visual comparison of script.

Adherency was determined by performing a drawdown on preweighed Linetta drawdown paper with approximately 0.8 g of sample (spread over an area of ¼ inch×1½ inch) and drawn down with a #6 cater-bar. The sample was allowed to dry completely (approximately 5 minutes at room temperature) and the paper was weighed again. The paper was then crumpled by hand, any flakes were blown off and the paper was reweighed. This test was also performed with erasable ink made according to U.S. Pat. Nos. 5,120,359 and 5,203,913 assigned to Sakura Color Products Corporation (Comparative Example 1)

Erasability was determined by performing an actual "WRITE-TEST" (similar to a spirograph wherein ink is applied in a circular arrangement on paper with some cross-over of ink occurring) with ball-point pens containing the erasable ink compositions of Examples 13 and 14 and the following commercially available pens which contain erasable ink:

| Pen | Ink Color | Comparative Example |
|---|---|---|
| Erasermate | Blue | 2 |
| Erasermate 2 | Blue | 3 |
| Scripto | Blue | 4 |
| Scripto | Red | 5 |

The "WRITE-TEST" write-downs were then erased and reflectance measurements were performed on the erased portion of the paper versus an unblemished/untouched portion of the paper. A quantitative value was then obtained, i.e., delta E*ab from CIE lab measurement (described in ASTM D-2244-89). Lower values indicate more complete erasures.

Smearability was subjectively evaluated for the erasable ink compositions of Examples 13 and 14 and Comparative Examples 2–5 1–2 seconds after writing by attempting to smudge the ink with one's fingers. A smear value of 1 represents essentially no smearing and a smear value of 5 represents such a degree of smearing that legibility of the writing is significantly impaired.

Table II below presents the properties of the erasable ink compositions:

TABLE II

| Example | Color Intensity | Viscosity (cps) | (Wt. % of Dried Ink Composition Retained on the Paper) | Erasability Value (delta E*ab) | Smear Value |
|---------|-----------------|-----------------|---------------------------------------------------------|-------------------------------|-------------|
| 13 | Comparable to Comparative Examples | ~3–5 | 100% | 3.17 | 1 |
| 14 | Comparable to Comparative Examples | ~3–5 | 100% | 1.44 | 1 |
| Comp. Ex. 1 | — | — | 63% | — | — |
| Comp. Ex. 2 | — | — | — | 3.3 | — |
| Comp. Ex. 3 | — | — | — | 3.63 | 2 |
| Comp. Ex. 4 | — | — | — | 5.38 | 3 |
| Comp. Ex. 5 | — | — | — | — | 4 |

The data in Table II clearly demonstrate the superiority of the erasable ink composition of this invention relative to commercially available erasable inks. The erasable ink composition of this invention is highly adherent to a substrate as to resist flaking therefrom and substantially erasable.

While this invention has been disclosed herein in connection with certain embodiments and certain procedural details, it is clear that changes, modifications or equivalents can be used by those skilled in the art. Accordingly, such changes within the principles of this invention are intended to be included within the scope of the claims below.

What is claimed is:

1. An erasable ink composition which comprises a waterborne polyurethane-urea obtained by effecting polymerization of a waterborne polyurethane-urea-forming reaction medium containing at least two coreactive polyfunctional monomers, said waterborne polyurethane urea containing dye moiety covalently bonded thereto, the erasable ink composition when applied to a substrate and upon drying thereon exhibiting less than about 30 weight percent flaking based on the weight of the dried ink and an erasability value delta E*ab of less than about 4.0.

2. The erasable ink composition of claim 1 exhibiting less than about 20 weight percent flaking based on the weight of the dried ink and an erasability value delta E*ab of less than about 3.5.

3. The erasable ink composition of claim 1 exhibiting less than about 20 weight percent flaking based on the weight of the dried ink and an erasability value delta E*ab of less than about 3.0.

4. The erasable ink composition of claim 1 wherein the composition possesses a viscosity of from about 1 to about 80,000 centipoises.

5. The erasable ink composition of claim 1 wherein the composition possesses a viscosity of from about 3 to about 30,000 centipoises.

6. The erasable ink composition of claim 1 wherein at least one of the monomers corresponds to the general formula

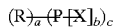

wherein R is a dye moiety covalently bonded to polymer residue P, X is a functional group, a, b and c each is at least 1, provided, the product of b x c is at least 2, when c is at least 2, a is 1 and where there is more than one R, P or X, each R, P or X can be the same or different.

7. The erasable ink composition of claim 1 wherein the waterborne polyurethane-urea is obtained by the solvent process which comprises:
 a) reacting a polymeric polyol with a diisocyanate to provide an isocyanate group-terminated prepolymer possessing or lacking sufficient hydrophilic groups to render the prepolymer self-dispersible;
 b) reacting the isocyanate group-terminated prepolymer dissolved in organic solvent with an aliphatic diamine chain extender and, where the prepolymer lacks sufficient hydrophilic groups to be self-dispersible, an aliphatic diamine chain extender possessing at least one hydrophilic group, to provide an organic solvent solution of self-dispersible polyurethane-urea; and,
 c) adding a sufficient amount of water to the organic solvent solution of the polyurethane-urea to form a dispersion of polyurethane-urea particles,
at least one of said polymeric polyol, diisocyanate and aliphatic diamine possessing a dye moiety covalently bonded thereto.

8. The erasable ink composition of claim 7 wherein the polymeric polyol is a polymeric diol of the general formula R-(P—OH)$_2$ wherein R is a dye moiety covalently bonded to polymer residue P and each P is the same or different.

9. The erasable ink composition of claim 8 wherein polymer residue P is that of a polyether, polyester or polycarbonate.

10. The erasable ink composition of claim 1 wherein the waterborne polyurethane-urea is obtained by the melt dispersion process which comprises:
 a) reacting a polymeric polyol, an aliphatic diol possessing at least one ionic group and a diisocyanate to provide an isocyanate group terminated prepolymer possessing ionic groups;
 b) reacting the isocyanate group-terminated prepolymer with a formaldehyde-reactive capping agent to cap the isocyanate end groups;
 c) dispersing the capped prepolymer in water; and,
 d) reacting the dispersed capped prepolymer with formaldehyde to provide dispersed polyurethane-urea particles,
at least one of said polymeric polyol, diisocyanate and aliphatic diamine possessing a dye moiety covalently bonded thereto.

11. The erasable ink composition of claim 10 wherein the polymeric polyol is a polymeric diol of the general formula R-(P—OH)$_2$ wherein R is a dye moiety covalently bonded to polymer residue P and each P is the same or different.

12. The erasable ink composition of claim 11 wherein polymer residue P is that of a polyether, polyester or polycarbonate.

13. The erasable ink composition of claim 1 wherein the waterborne polyurethane-urea is obtained by the prepolymer mixing process which comprises:
   a) reacting a polymeric polyol, a carboxylic group-containing diol and an aliphatic diisocyanate to provide an isocyanate group-terminated prepolymer possessing free carboxyl groups;
   b) reacting the prepolymer with a tertiary amine to convert the carboxyl groups to ammonium carboxylate groups and render the prepolymer self-dispersible;
   c) dispersing the self-dispersible prepolymer in water; and,
   d) reacting the dispersed prepolymer with a diamine chain extender to provide an aqueous dispersion of polyurethane-urea particles, at least one of said polymeric polyol, carboxyl group-containing diol, aliphatic diisocyanate and aliphatic liquid diamine chain extender possessing a dye moiety covalently bound thereto.

14. The erasable ink composition of claim 13 wherein the polymeric polyol is a polymeric diol of the general formula R$-$(P$-$OH)$_2$ wherein R is a dye moiety covalently bonded to polymer residue P and each P is the same or different.

15. The erasable ink composition of claim 14 wherein polymer residue P is that of a polyether, polyester or polycarbonate.

16. The erasable ink composition of claim 1 wherein the waterborne polyurethane-urea is obtained by the ketamine/ketazine process which comprises:
   a) reacting a polymeric polyol, a carboxylic group-containing diol and a diisocyanate to provide an isocyanate group-terminated prepolymer possessing free carboxyl groups;
   b) reacting the prepolymer with a tertiary amine to convert the carboxyl groups to ammonium carboxylate groups and render the prepolymer self-dispersible;
   c) reacting the self-dispersible prepolymer with at least one member of the group consisting of ketimine and ketazine in the presence of water to provide an aqueous dispersion of polyurethane-urea particles, at least one of said polymeric polyol, carboxyl group-containing diol, aliphatic diisocyanate and aliphatic liquid diamine chain extender possessing a dye moiety covalently bound thereto.

17. The erasable ink composition of claim 16 wherein the polymeric polyol is a polymeric diol of the general formula R$-$(P$-$OH)$_2$ wherein R is a dye moiety covalently bonded to polymer residue P and each P is the same or different.

18. The erasable ink composition of claim 17 wherein polymer residue P is that of a polyether, polyester or polycarbonate.

19. The erasable ink composition of claim 1 wherein the composition further comprises at least one additional component selected from the group consisting of natural latices, synthetic latices, rheological modifiers, suspension agents, humectants, emulsifiers, surfactants, plasticizers, spreading agents, drying agents, release agents, parting agents, preservatives, antimicrobial agents, anticorrosion agents, antioxidants and coalescing aids.

20. A marking instrument containing the erasable ink composition of claim 1.

21. The marking instrument of claim 20 which is a ball-point pen.

22. The erasable ink composition of claim 1 wherein at least one of the polyfunctional monomers possesses a dye moiety covalently bonded thereto.

* * * * *